(12) United States Patent
Schmidt

(10) Patent No.: US 12,017,757 B2
(45) Date of Patent: Jun. 25, 2024

(54) AUGMENTER FOR A LANDING GEAR DRIVE SYSTEM

(71) Applicant: Safran Landing Systems Canada Inc., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 0 days.

(21) Appl. No.: 17/728,280

(22) Filed: Apr. 25, 2022

(65) Prior Publication Data
US 2023/0339606 A1  Oct. 26, 2023

(51) Int. Cl.
*B64C 25/32* (2006.01)

(52) U.S. Cl.
CPC ................... *B64C 25/405* (2013.01)

(58) Field of Classification Search
CPC . B64C 25/405; B64C 25/40; B60K 2025/028; B60K 7/00; B60K 7/0023
See application file for complete search history.

(56) References Cited

U.S. PATENT DOCUMENTS

| | | | | |
|---|---|---|---|---|
| 184,059 | A | * | 11/1876 | Brintnall ............. B60B 17/0027 105/63 |
| 2,778,467 | A | * | 1/1957 | Lewis ...................... F16D 41/12 192/50 |
| 9,630,707 | B2 | | 4/2017 | Jaber et al. |
| 9,650,131 | B2 | | 5/2017 | Jaber et al. |
| 10,118,691 | B2 | * | 11/2018 | Cox ....................... B64C 25/405 |
| 11,261,886 | B1 | * | 3/2022 | Chen ....................... F15B 15/14 |
| 2010/0065678 | A1 | * | 3/2010 | Kiyosawa ............. B64C 25/405 244/50 |
| 2010/0276535 | A1 | * | 11/2010 | Charuel ................ B64C 25/405 244/50 |
| 2017/0121013 | A1 | * | 5/2017 | Christensen ............ B64C 25/42 |
| 2020/0277044 | A1 | * | 9/2020 | Kerr ........................ B64C 25/30 |
| 2020/0277065 | A1 | * | 9/2020 | Thomassin ............ B64D 27/12 |
| 2022/0390032 | A1 | * | 12/2022 | Knoke ................... B60T 13/683 |

FOREIGN PATENT DOCUMENTS

| | | | | |
|---|---|---|---|---|
| GB | 2584310 | A | * 12/2020 | ........... B64C 25/405 |
| GB | 2585823 | A | * 1/2021 | ............. B64C 25/34 |
| WO | WO-2012171589 | A1 | * 12/2012 | ........... B64C 25/405 |

* cited by examiner

*Primary Examiner* — Richard Green
*Assistant Examiner* — Anna L. Gordon
(74) *Attorney, Agent, or Firm* — CHRISTENSEN O'CONNOR JOHNSON KINDNESS PLLC

(57) ABSTRACT

A drive augmenter provide supplemental drive power to the wheel of a landing gear with a drive system. The landing gear has a wheel rotatably mounted to an axle, and the drive system selectively provides a driving force to rotate the wheel. The drive augmenter includes a piston slidably disposed with a cylinder, and selective pressurization of the cylinder drives reciprocating translation of the piston within the cylinder. A crank is coupled to the piston by a rod and is also coupled to a crankshaft. The crank is configured to convert translation of the piston into rotation of the crankshaft. The drive augmenter further includes a drive shaft coupled to the wheel and a clutch configured to selectively transfer rotation of the crankshaft to the drive shaft.

15 Claims, 6 Drawing Sheets

AUGMENTER FOR A LANDING GEAR DRIVE SYSTEM

BACKGROUND

Autonomous drive systems enable aircraft to be moved without the assistance of a tractor while the jet engines of the aircraft are not currently in operation. These systems typically operate by providing drive capabilities to one or more wheels of an aircraft. By utilizing electric or hydraulic motors (or other power sources) to drive the wheels, operators can push back from gates and taxi without having to use the aircraft's jet engines or tow tractors. As a result, fuel costs, wear and maintenance on the jet engines, and noise are all reduced.

An exemplary embodiment of an autonomous drive system is disclosed in U.S. Pat. No. 9,650,131, issued to Jaber et al., ("Jaber") and currently assigned to Safran Landing Systems, the disclosure of which is expressly incorporated herein. As shown in FIG. 1, Jaber teaches a drive system 30 for a landing gear 10 used, for example, on an aircraft. The landing gear 10 includes a strut 12 extending downward from the body of the aircraft, and an axle 14 extending laterally from the strut. A wheel 16 includes a tire 20 mounted to a rim 18, which is itself rotatably mounted to the axle 14 about axis 40. The drive system 30 includes a motor 32 connected to both the axle 14 and the rim 18. The motor 32 selectively rotates the wheel 16 relative to the axle 14 and, thus, provides a motive force to taxi the aircraft.

When sizing autonomous drive systems, it may be found that the required wheel torque to get the aircraft moving from a stop, especially after it has been parked for some time, or if against an obstacle, is significantly greater than the torque required to accelerate the wheel and aircraft during typical taxiing maneuvers. This is especially true for drive systems that utilize electric motors, also referred to as E-taxi systems. For E-taxi systems in particular, sizing the motor to provide this high "breakaway" torque can result in a system that is very heavy and consumes high power during operation. It would be desirable to have a system that provides a high initial "breakaway" torque and then reverts to the normal operation.

SUMMARY

The present disclosure provides examples of a drive augmenter that supplies supplemental driving force to the drive system of a landing gear. In an embodiment, the landing gear has a wheel rotatably mounted to an axle, and the drive system selectively provides a driving force to rotate the wheel. The drive augmenter includes a piston slidably disposed with a cylinder, wherein selective pressurization of the cylinder drives reciprocating translation of the piston within the cylinder. A crank is coupled to the piston by a rod and is also coupled to a crankshaft. The crank is configured to convert translation of the piston into rotation of the crankshaft. The drive augmenter further includes a drive shaft coupled to the wheel and a clutch configured to selectively transfer rotation of the crankshaft to the drive shaft.

In any embodiment, translation of the piston is limited so that the piston does not reach a top dead center position or a bottom dead center position.

In any embodiment, the drive augmenter further includes a valve in fluid connection with the piston and a reservoir containing a pressurized fluid in communication with the valve. A controller is programmed to control the movement of the valve between a first position and a second position, wherein the reservoir is in fluid communication with the piston when the valve is in the first position, and the valve vents the cylinder in the second position.

In any embodiment, pressurization of the cylinder when the valve is in the first position drives the piston to a bottom position, and a spring drives the piston to a top position when the valve is in the second position.

In any embodiment, movement of the valve between the first and second positions produces a ratcheting rotation of the crankshaft.

In any embodiment, the clutch is an overrunning clutch.

In any embodiment, the clutch is in communication with the controller, which is programed to selectively switch the clutch between a first configuration, in which the drive shaft rotates in the same direction as the crankshaft, and a second configuration, in which the drive shaft rotates in a direction opposite the direction of the crankshaft.

In any embodiment, the controller is programmed to activate the drive augmenter for a limited duration when the drive system is first activated and the wheel is not rotating.

In any embodiment, the drive augmenter is further configured to sense a resistive torque in the wheel, wherein the controller is programmed to activate the drive augmenter for a limited duration when the drive system is rotating the wheel and sensed resistive torque is greater than a predetermined threshold.

In any embodiment, the landing gear axle is mounted to a landing gear strut and the cylinder is integrally formed with or disposed within the strut.

In any embodiment, the drive system comprises an electric motor that produces the driving force to rotate the wheel.

In any embodiment, a landing gear for an aircraft includes a wheel rotatably mounted to an axle and a drive system configured to provide a primary drive force to rotate the wheel. The landing gear further includes a drive augmenter configured to provide supplemental drive force to rotate the wheel.

In accordance with another embodiment, a drive augmenter is configured for use with a landing gear with a drive system. The landing gear has a wheel rotatably mounted to an axle, and the drive system selectively provides a driving force to rotate the wheel. The drive augmenter comprises a piston slidably disposed with a cylinder such that the cylinder does not reach a top dead center position or a bottom dead center position. A valve is configured to alternatingly pressurize and vent the cylinder to translate the piston within the cylinder in a reciprocating motion. A crank is coupled to the piston and configured to convert the reciprocating motion of the piston into ratcheting rotation of the crankshaft. A drive shaft is coupled to the wheel, and an overrunning clutch is configured to transfer the ratcheting rotation of the crankshaft into ratcheting motion of the drive shaft.

In any embodiment, the clutch is configured to selectively change a direction of the ratcheting motion of the drive shaft relative to a direction of the ratcheting motion of the crankshaft.

In any embodiment, the drive augmenter further comprises a compressed gas source in fluid communication with the valve, wherein the valve is configured to selectively place the compressed gas source in fluid communication with the cylinder to pressurize the cylinder.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of an autonomous drive system for an aircraft landing gear with a drive augmenter are set forth below according to technologies and methodologies of the present disclosure. In an embodiment, known drive systems are utilized to provide a rotational force to one or more landing gear wheels that allows the aircraft to move without the use of tow tractors or engine thrust. The augmenter provides temporary supplemental torque the drive system when the aircraft initially begins to move from a stop or encounters an obstruction during taxiing.

Figure 1:
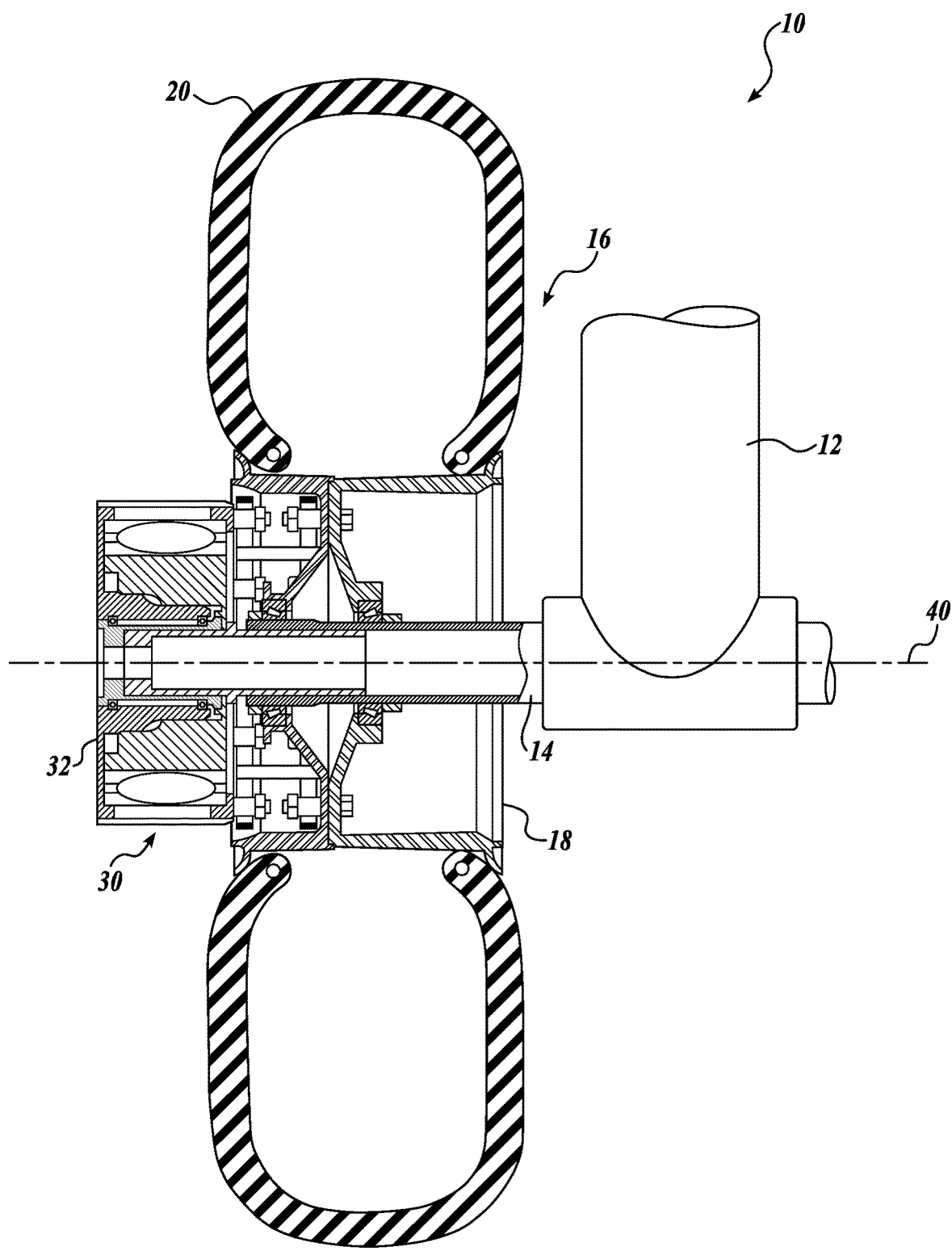
FIG. 1 shows a partial cross-sectional view of an aircraft landing gear with a drive system according to the prior art.
Figure 2:
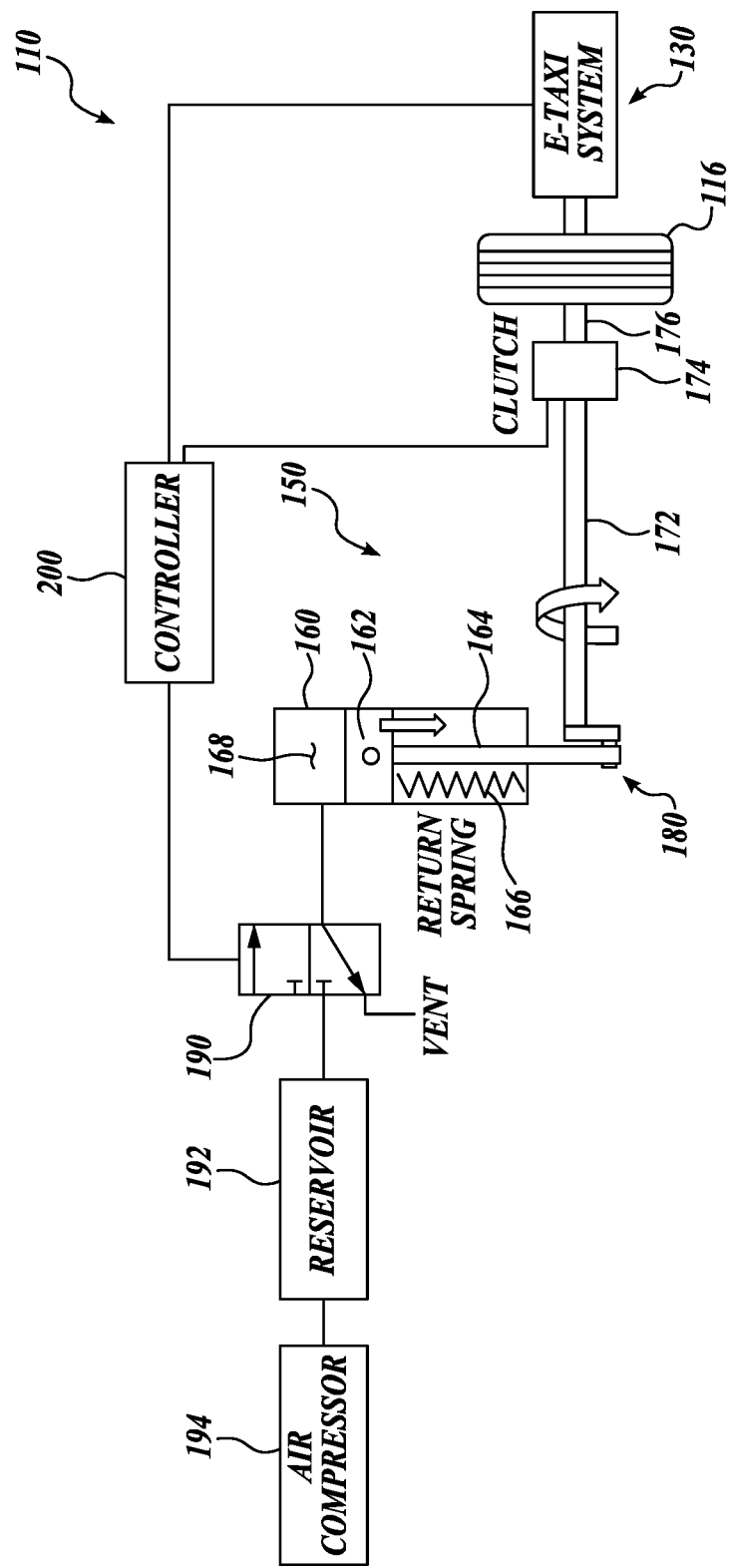
FIG. 2 shows a schematic view of an aircraft landing gear with a drive system and a drive augmenter in accordance with an embodiment of the present disclosure.
Figure 4:
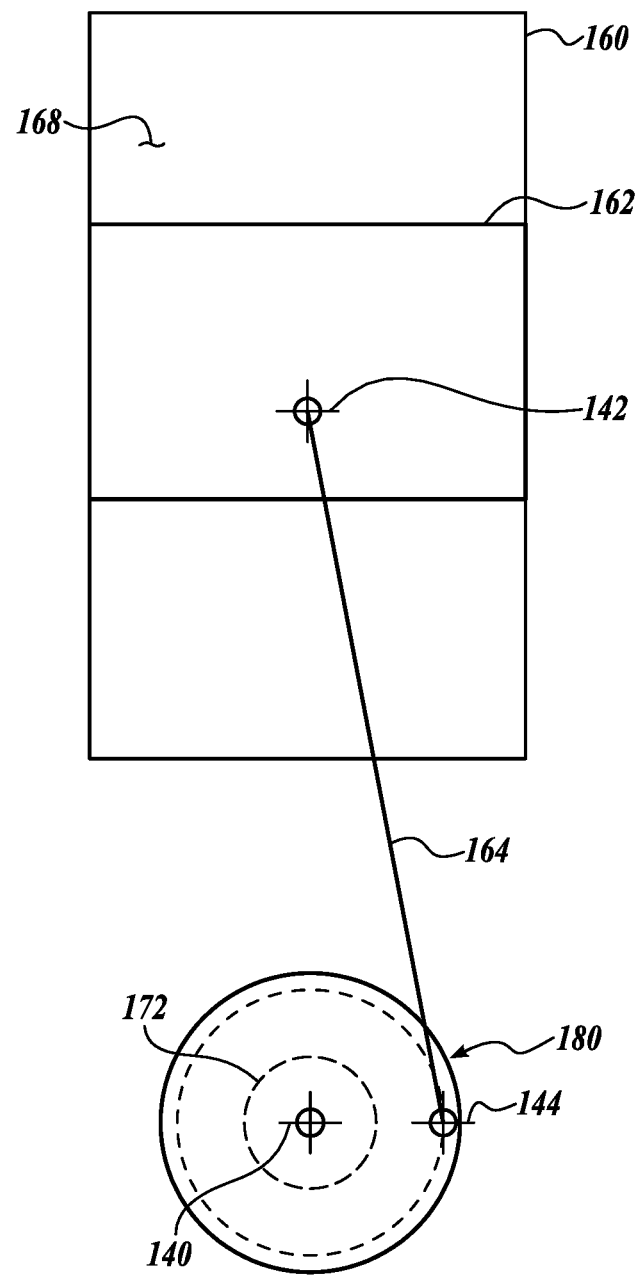
FIG. 4 shows a partial cross-sectional view, wherein the piston is in a middle position.
Figure 5:
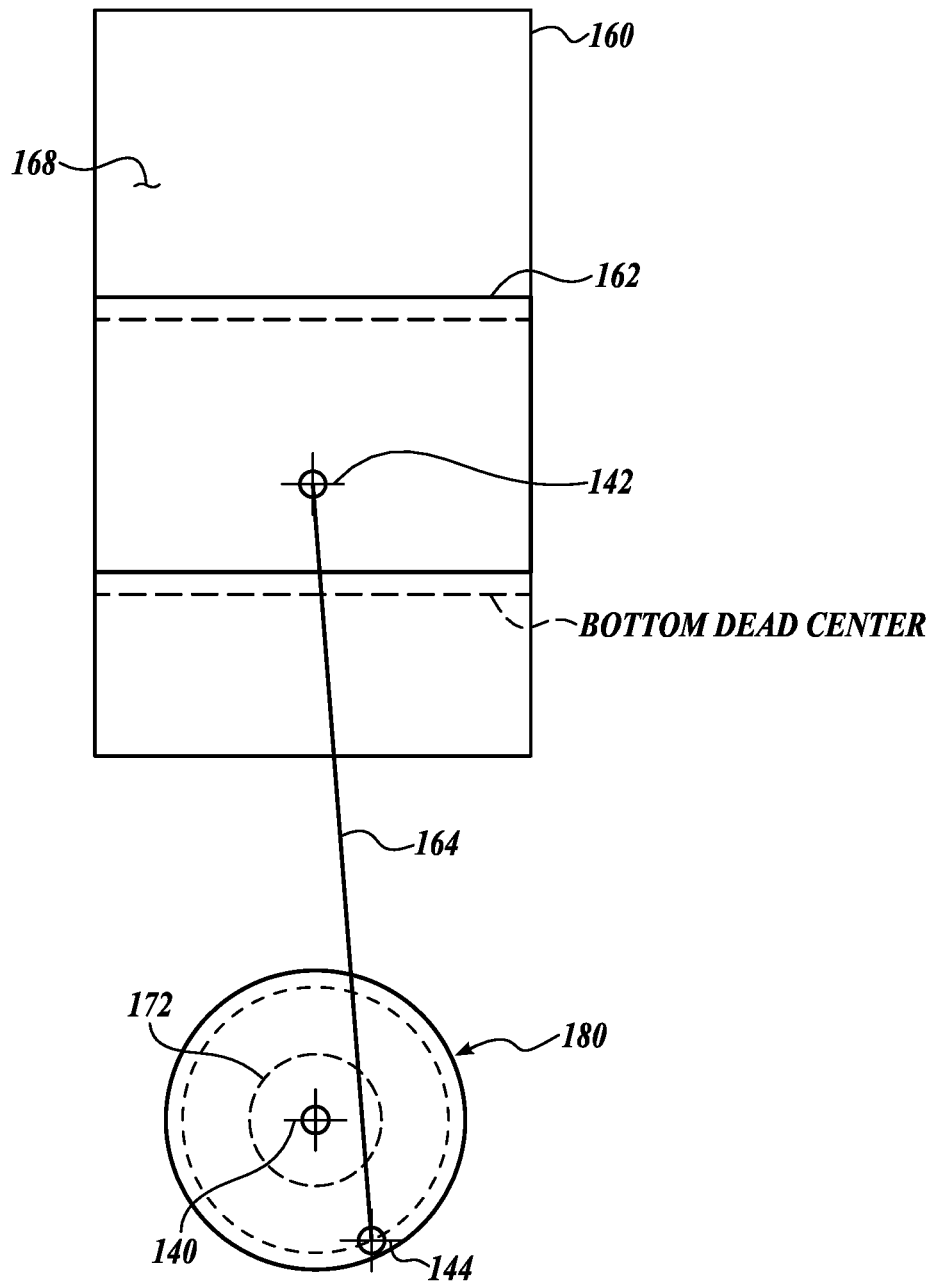
FIG. 5 shows a partial cross-sectional view, wherein the piston is in a bottom position.
Figure 6:
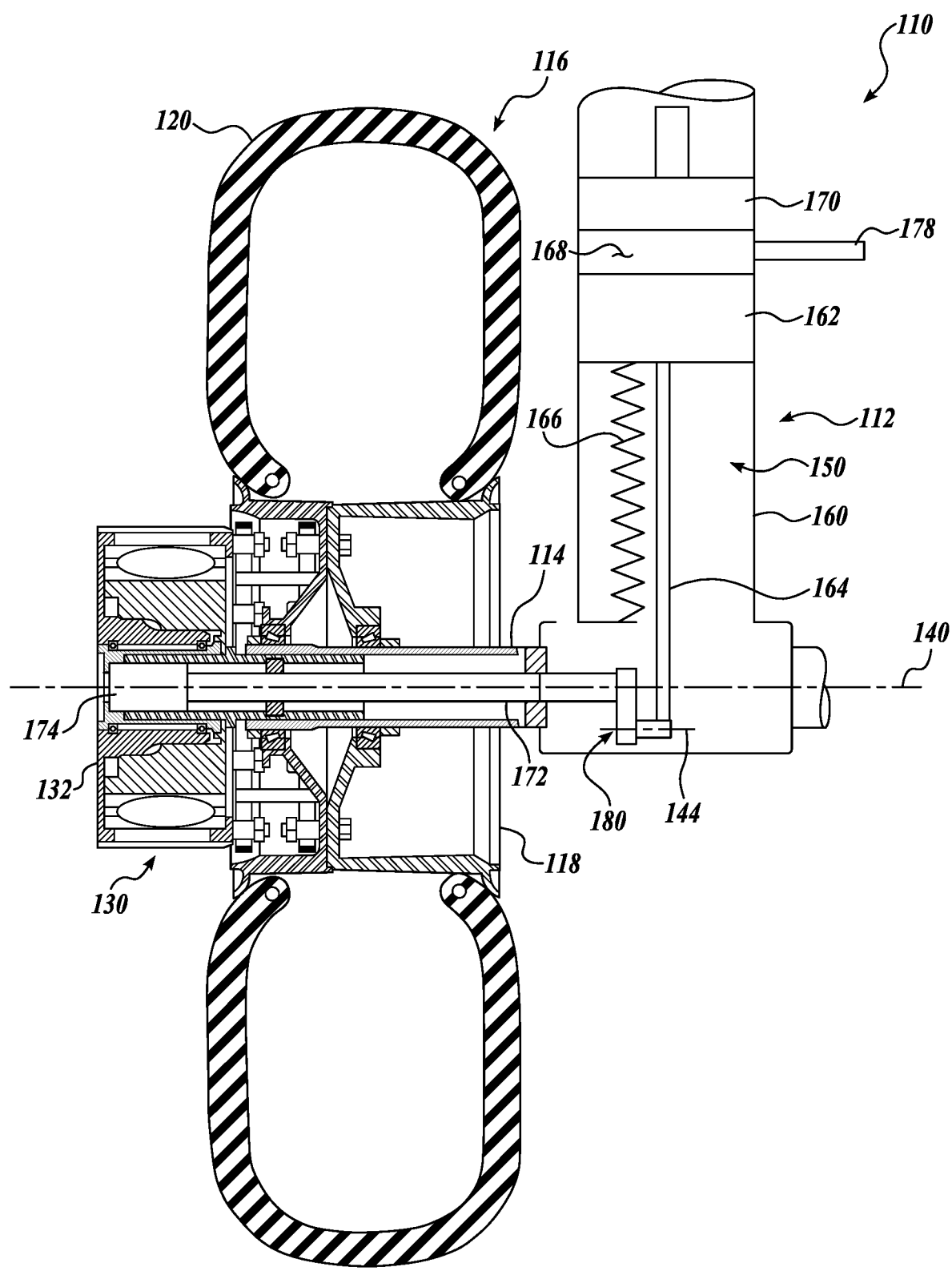
FIG. 6 shows a partial cross-sectional view of an aircraft landing gear with a drive system and a drive augmenter in accordance with another embodiment of the present disclosure.

FIGS. 2-6 show representative embodiments of a landing gear 110 according to aspects of the present disclosure. Referring specifically to FIGS. 2 and 6, views of the landing gear 110 are shown in conjunction with a drive system 130 and a drive augmenter 150. The landing gear 110 and drive system 130 are similar to the landing gear 10 and drive system 30, respectively, shown in FIG. 1. Components of the landing gear 110 and drive system 130 shown in FIGS. 2 and/or 6 that are labeled with reference number 1XX correspond to similar components labeled with reference number XX in FIG. 1, except as noted. For example, the drive (E-taxi) system 130 shown in FIGS. 2 and 6 is similar to the drive system 30 shown in FIG. 1 unless otherwise described. Similarly, the axle 114, rim 118, tire 120 and motor 132 shown in FIG. 6 correspond to the axle 14, rim 18, tire 20, and motor 32, respectively, shown in FIG. 1.

While the drive system 130 is shown as an E-taxi system, i.e., a drive system powered by an electric motor, the drive augmenter 150 can be used with drive systems that utilize other types of drive motors or power sources, including hydraulic, pneumatic, or any other suitable drive motor/power source or combinations thereof. Thus, even when an E-taxi system is being described, it will be appreciated that the disclosure and claimed subject matter are not limited to the use of a drive augmenter with a particular type of drive system.

As shown in the embodiment of FIG. 2, the drive augmenter 150 includes a cylinder 160 with a piston 162 slidably disposed therein. A rod 164 is rotatably coupled at one end to the piston 162. A second end of the rod is rotatably coupled to a crank 180 that is itself coupled to a crankshaft 172. As configured, the crank 180 converts translation of the piston 162 within the cylinder 160 into rotation of the crankshaft 172. More specifically, translation of the piston 162 in a first direction rotates the crankshaft 172 in a first direction, and translation of the piston in a second direction rotates the crankshaft in a second direction. In some embodiments, the drive augmenter 150 includes a cam/cam follower configuration or any other known transmission configured to convert translation of the piston 162 into rotation of the crankshaft 172.

Within the cylinder 160, the volume 168 on one side of the piston is in fluid communication with a valve 190 that provide selective fluid communication with a reservoir 192 of compressed gas. A compressor 194 is in fluid communication with the reservoir 192 and maintains the pressure within the reservoir 192 above a predetermined level. That is, the compressor 194 ensures that a sufficient supply of compressed gas is maintained within the reservoir 192 to ensure that the drive augmenter 150 is operable when necessary.

In a first position, the valve 190 provides fluid communication between the reservoir 192 and the cylinder 160. When the valve 190 is in the first position, the increased pressure provided from the reservoir 192 urges the piston 162 in a first direction (downward as illustrated in FIG. 2) away from a top position. A return spring 166 is positioned within the cylinder 160 on the opposite side of the piston 162 from the connection to the valve 190. As the piston 162 moves in the first direction in response to the increased pressure, the return spring 166 is compressed.

In a second position, the valve 190 provides fluid isolation of the reservoir 192 from the cylinder 160. When so positioned, the valve 190 also vents the cylinder 160 to the atmosphere so that that the pressure within the piston equalizes with atmospheric pressure. As the pressurized air within the cylinder 160 is vented to atmosphere, the return spring 166 applies a force to the cylinder 160 that drives the cylinder back to the top position.

In some embodiments, a controller 200 (e.g., a control circuit, etc.) is operatively connected to the valve 190. The controller 200 is configured (e.g., specifically programmed to, etc.) to selectively move the valve 190 between the first position and the second position. In other words, the controller 200 is capable of generating suitable control signals to the valve 190, and upon receipt of these control signals, the valve 190 is capable of transitioning between the first position and the second position. The resulting intermittent pressurization in the cylinder 160 drives reciprocating translation of the piston 162 within the cylinder.

Figure 3:
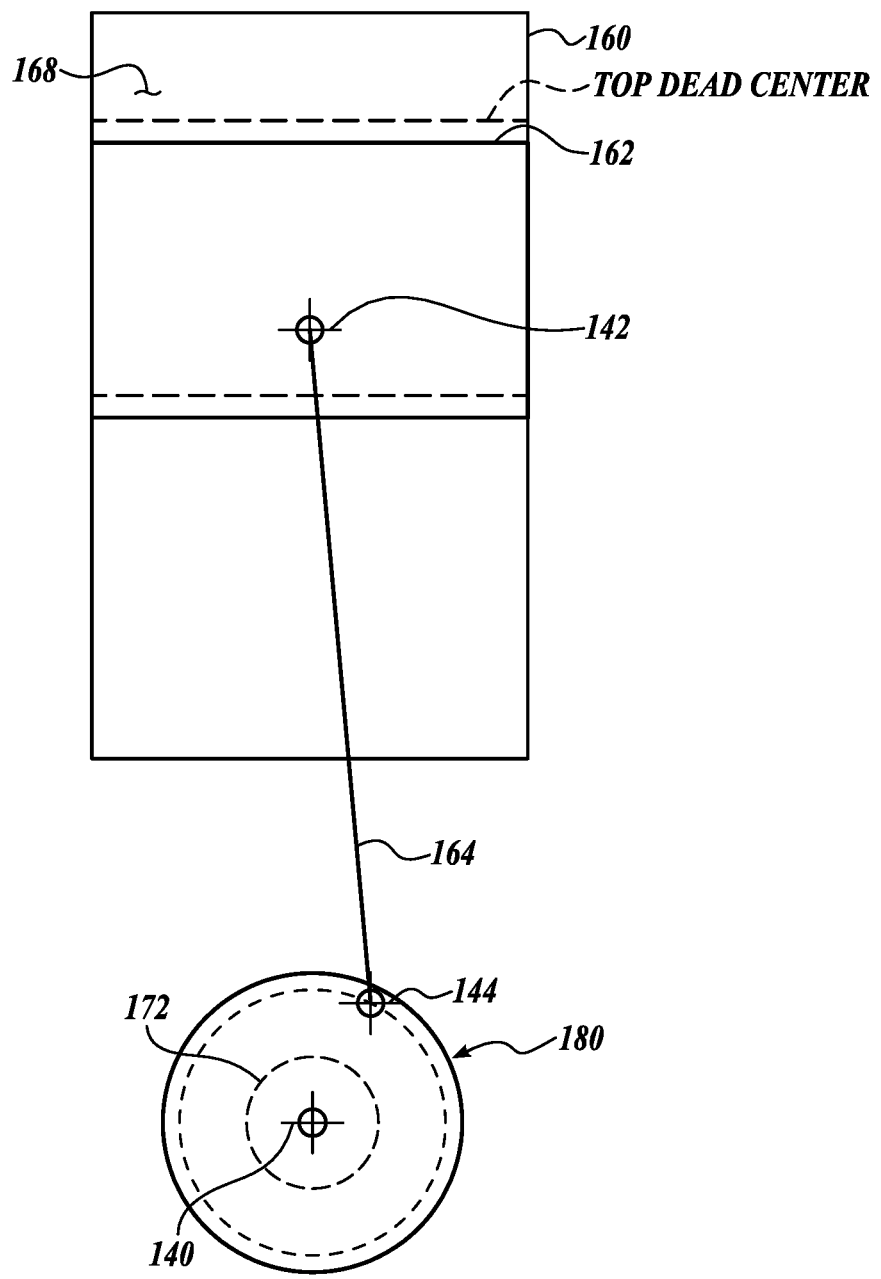
FIG. 3 shows a partial cross-sectional view of a piston of the drive augmenter shown in FIG. 2, wherein the piston is a top position.

Referring now to FIGS. 3-5, motion of the piston 162 during operation of the drive augmenter 150 will be described. When the drive augmenter is not in use, the valve 190 is in the second position, and the piston 162 is in a top position (shown in FIG. 3), which is offset from a top dead center. In some embodiments, the return spring 166 provides a biasing force that maintains engagement between the piston 160 and an internal stop that limits further upward movement of the piston.

To begin operation of the drive augmenter 150, the controller 200 moves (e.g., controls the movement of) the valve 190 to the first position to pressurize the cylinder 160. The pressure in the cylinder 160 drives the piston 162 downward against the force of the return spring 166. The rod 164, which is rotatably coupled to the piston 162 about axis 142 and to the crank 180 about axis 144, drives rotation of the crankshaft 172 about axis 140 as the piston moves downward.

The piston 162 continues to move downward through a middle position (FIG. 4) to a bottom position (FIG. 5), rotating the crankshaft 172 in a clockwise direction (as viewed in FIGS. 3-5). In the bottom position of FIG. 5, the piston 162 has not reached bottom dead center. When the piston 162 reaches the bottom position, the controller 200 returns the valve to the second position, thereby venting the cylinder 160. In some embodiments, a positional sensor on the piston 162, the crank 180, the crankshaft 172, or any other suitable structure senses when the piston has reached the bottom position and outputs a position signal to the controller 200. The controller 200 moves the valve to the second position in response to the position signal received from the positional sensor. With the cylinder 160 vented, the return spring 166 drives the piston 162 back to the top position, rotating the crankshaft 172 in a counter-clockwise direction (as viewed in FIGS. 3-5).

If the drive augmenter 150 is still required, the controller 200 moves the valve 190 to the first position, and the drive cycle, in which the piston 162 is driven to the bottom position and then returns to the top position, begins again. As long as the drive augmenter 150 is active, the piston 162 continues to reciprocate between the top position and the bottom position, which rotates the crankshaft 172 back and forth about axis 140.

Referring back to FIG. 2, the crankshaft 172 is coupled to a driveshaft 176 by a clutch 174 that selectively transfers rotation of the crankshaft 172 to the driveshaft 176. In some embodiments, the clutch 174 is an overrunning clutch that transfers rotation of the crankshaft 172 to the driveshaft 176 when the piston 162 moves from the top position to the bottom position. When the piston 162 returns from the bottom position to the top position, the clutch 174 permits free rotation of the crankshaft 172 relative to the drive shaft 176. As such, the movement of the crankshaft can be referred to as a ratcheting motion.

In some embodiments, the clutch 174 is a known overrunning clutch configured to selectively transfer rotation of the crankshaft 172 to the driveshaft 176 in the same direction as the crankshaft or in the opposite direction of the crankshaft. In some embodiments, the controller 200 is operably coupled to selectively control the rotational direction of the driveshaft 176 relative to the crankshaft 172.

The driveshaft 176 is coupled to the wheel 116 to transfer rotation of the driveshaft 176 to the wheel 116 as a supplemental rotational force, i.e., to supplement the torque provided by the drive system 130. In some embodiments, the controller 200 is operably coupled to the drive system 130, such as the E-taxi system shown in FIG. 2.

To taxi the aircraft, an operator or pilot engages the drive system 130 by providing input to a control (not shown) that is operably connected to the controller 200. In response to the input, the controller 200 engages the drive system 30 to provide torque that drives the associated wheel 116 or wheels. As the wheel starts to move from a static position, i.e., when the aircraft is not moving, the controller 200 engages the clutch 174 and also begins cycling the valve 90 between the first and second states. Cycling the valve 190 in this manner rotates the crankshaft 172 in a reciprocating manner, as previously described. The overrunning clutch 174 converts the reciprocating, i.e., ratcheting, rotation of the crankshaft 172 into unidirectional rotation of the driveshaft 174 to provide supplemental torque to the driving torque provided by the drive system 130.

In some embodiments, the speed of the wheel 116 driven by the drive system 130 and drive augmenter 150 is sensed and provided to the controller 200. In some embodiments, a resistive torque of the wheel 116 is sensed and provided to the controller 200. In some embodiments, the controller 200 temporarily engages the drive augmenter 150 when the drive system 130 is initially engaged and the aircraft is not moving. In some embodiments, the drive augmenter 150 is disengaged a predetermined time or a predetermined number of cycles after being engaged. In some embodiments, the drive augmenter 150 is engaged after a sensed resistive torque exceeds a predetermined level, even when the aircraft is moving. In some embodiments, the drive augmenter 150 is disengaged after a sensed resistive torque drops below a predetermined level. It will be appreciated that any number of suitable operating parameters can be sensed and utilized to engage and/or disengage the drive augmenter 150, and such alternate configurations should be considered within the scope of the present disclosure.

FIG. 6 shows an embodiment of the drive augmenter 150 shown in FIGS. 2-5 in conjunction with a landing gear 110 and drive system 130. In the illustrated embodiment, the cylinder 160 is integrally formed with the strut 112. More specifically, an end wall 170 is formed or mounted within an otherwise unused interior space of the strut 112, and the piston is slidably disposed within strut. In some embodiments, the cylinder 160 is formed separate from the strut 112 and then mounted within the strut. A port 178 is formed in the strut 112 and is configured to provide fluid connection between the valve 190 (not shown) and the interior portion of the strut 112 between the piston 162 and the end wall 170.

As shown in FIG. 6, various components of the drive augmenter 150, such as the rod 164, crank 180 crankshaft 172, clutch 174, etc., are positioned within the existing envelop of the landing gear 10 and drive system 30 of FIG. 1. By utilizing otherwise unoccupied space within the existing landing gear structure, the additional weight and space required for the drive augmenter is reduced, which is particularly beneficial in aircraft and in landing gear bays in particular.

Various embodiments of the present disclosure are described as using a controller 200 to control various components of the drive augmenter 150 and/or drive system 130 in response to, for example, various sensor data. In some embodiments, the controller 200 is a discrete controller. In some embodiments, the described functions of the controller 200 are performed by one or more other control units, controllers, the FADEC, etc., of the aircraft. In some embodiments, the discrete controller and/or the one or more other control units comprise hardware circuitry (e.g., analog and/or digital circuits, etc.) for carrying out its functionality described herein. In other embodiments, the controller or the various control units include, for example, a processor and memory. The memory may include computer readable storage media in read-only memory (ROM), random-access memory (RAM), and keep-alive memory (KAM), for example. The KAM may be used to store various operating variables or program instructions while the processor is powered down. The program instructions, when executed by the processor, is configured to carry out the functionality of the controller 200 described above. In that regard, the processor and/or memory storing the program instructions forms a special purpose controller or control circuit specifically configured to carry out the methodologies and technologies described herein.

The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

Certain embodiments disclosed herein utilize circuitry (e.g., one or more circuits) in order to implement standards, protocols, methodologies or technologies disclosed herein, operably couple two or more components, generate information, process information, analyze information, filter signals, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A landing gear, comprising:
    a wheel mounted to an axle and being rotatable relative to the axle about an axis;
    a drive system coupled to the axle and selectively providing a driving force that rotates the wheel; and
    a drive augmenter, comprising:
        a piston slidably disposed within a cylinder, selective pressurization of the cylinder driving reciprocating translation of the piston within the cylinder;
        a crank coupled to the piston by a rod and coupled to a crankshaft, the crank being configured to convert translation of the piston into rotation of the crankshaft;
        a drive shaft at least partially disposed within the axle, the drive shaft being rotatable relative to the axle and operably coupled to the wheel; and
        a clutch configured to selectively transfer rotation of the crankshaft to the drive shaft, so that translation of the piston drives rotation of the wheel.

2. The drive augmenter of claim 1, wherein translation of the piston is limited so that the piston does not reach a top dead center position or a bottom dead center position.

3. The drive augmenter of claim 1, further comprising:
    a valve in fluid connection with the piston;
    a reservoir containing a pressurized fluid in communication with the valve; and
    a controller programmed to move the valve between a first position and a second position, wherein the reservoir is in fluid communication with the piston when the valve is in the first position, and the valve vents the cylinder in the second position.

4. The drive augmenter of claim 3, wherein pressurization of the cylinder when the valve is in the first position drives the piston to a bottom position, and a spring drives the piston to a top position when the valve is in the second position.

5. The drive augmenter of claim 4, wherein movement of the valve between the first and second positions produces a ratcheting rotation of the crankshaft.

6. The drive augmenter of claim 5, wherein the clutch is an overrunning clutch.

7. The drive augmenter of claim 6, wherein the clutch is in communication with the controller, the controller being programed to selectively switch the clutch between a first configuration, in which the drive shaft rotates in the same direction as the crankshaft, and a second configuration, in which the drive shaft rotates in a direction opposite the direction of the crankshaft.

8. The drive augmenter of claim 4, wherein the controller is programmed to activate the drive augmenter for a limited duration when the drive system is first activated and the wheel is not rotating.

9. The drive augmenter of claim 4, further configured to sense a resistive torque in the wheel, wherein the controller is programmed to activate the drive augmenter for a limited duration when the drive system is rotating the wheel and sensed resistive torque is greater than a predetermined threshold.

10. The drive augmenter of claim 4, wherein the axle of the landing gear is mounted to a landing gear strut and the cylinder is integrally formed with or disposed within the landing gear strut.

11. The drive augmenter of claim 1, wherein the drive system comprises an electric motor that produces the driving force to rotate the wheel.

12. An aircraft, comprising
    the drive augmenter according to claim 1, wherein the drive augmenter is configured to provide supplemental drive force to rotate the wheel.

13. A landing gear, comprising:
    a wheel rotatably mounted to an axle;
    a drive system selectively providing a driving force to rotate the wheel relative to the axle; and
    a drive augmenter, comprising:
        a piston slidably disposed with a cylinder, wherein the piston does not reach a top dead center position or a bottom dead center position;
        a valve configured to alternatingly pressurize and vent the cylinder to translate the piston within the cylinder in a reciprocating motion;
        a crank coupled to the piston and configured so that the reciprocating motion of the piston drives ratcheting rotation of a crankshaft;
        a drive shaft disposed within the axle and coupled to the wheel; and
        an overrunning clutch configured to transfer the ratcheting rotation of the crankshaft into ratcheting motion of the drive shaft,
    wherein translation of the piston drives rotation of the wheel.

14. The drive augmenter of claim 13, wherein the overrunning clutch is configured to selectively change a direction of the ratcheting motion of the drive shaft relative to a direction of the ratcheting motion of the crankshaft.

15. The drive augmenter of claim 13, further comprising a compressed gas source in fluid communication with the valve, wherein the valve is configured to selectively place the compressed gas source in fluid communication with the cylinder to pressurize the cylinder.

\* \* \* \* \*